(12) United States Patent
Webb et al.

(10) Patent No.: US 8,406,637 B2
(45) Date of Patent: Mar. 26, 2013

(54) AUTOMATIC PRE-EMPHASIS

(75) Inventors: Stephen Michael Webb, Gravesend (GB); David Winterburn, Ware (GB); Stephen Debruslais, London (GB)

(73) Assignee: Xtera Communications, Inc., Allen, TX (US)

( * ) Notice: Subject to any disclaimer, the term of this patent is extended or adjusted under 35 U.S.C. 154(b) by 1304 days.

(21) Appl. No.: 12/127,589

(22) Filed: May 27, 2008

(65) Prior Publication Data

US 2009/0297148 A1    Dec. 3, 2009

(51) Int. Cl.
*H04B 10/04* (2006.01)

(52) U.S. Cl. ......... 398/197; 398/79; 398/192; 398/196; 398/201; 398/33; 398/38; 398/159; 398/160

(58) Field of Classification Search .............. 398/7–38, 398/79, 147, 148, 192, 193, 194, 195, 106, 398/107, 198, 199, 94, 95, 158, 159, 160, 398/162, 183, 186, 196, 197, 200, 201
See application file for complete search history.

(56) References Cited

U.S. PATENT DOCUMENTS

| | | | | |
|---|---|---|---|---|
| 7,149,424 | B2 * | 12/2006 | Kamalov et al. | 398/27 |
| 7,194,210 | B2 * | 3/2007 | Uda et al. | 398/159 |
| 7,440,703 | B2 * | 10/2008 | Shastri et al. | 398/183 |
| 2002/0163683 | A1 * | 11/2002 | Antoniades et al. | 359/110 |
| 2004/0042793 | A1 * | 3/2004 | Hachiya et al. | 398/79 |
| 2004/0208516 | A1 * | 10/2004 | Clark et al. | 398/26 |
| 2008/0085126 | A1 * | 4/2008 | Kokkinos | 398/171 |

FOREIGN PATENT DOCUMENTS

| | | |
|---|---|---|
| EP | 0543570 A2 | 5/1993 |
| EP | 0924888 A2 | 6/1999 |
| EP | 1388961 A1 | 2/2004 |
| GB | 2423900 A | 9/2006 |
| WO | 03088542 A1 | 10/2003 |

* cited by examiner

*Primary Examiner* — Hanh Phan
(74) *Attorney, Agent, or Firm* — James Harian

(57) ABSTRACT

A system and method are provided for controlling the pre-emphasis applied to an optical signal, in which the output level of individual transmitters is controlled in order to reach a pre-defined desired value of a quality metric. Transmitters are able to adjust their output power without external control in such a way as to optimise the power distribution across the system.

17 Claims, 3 Drawing Sheets

AUTOMATIC PRE-EMPHASIS

FIELD OF THE INVENTION

The present invention relates to the pre-emphasis of optical channels in communications systems. In particular, the present invention relates to the adjustment of the launch power of channels in a wavelength division multiplexed (WDM) optical communications system.

BACKGROUND TO THE INVENTION

In a WDM optical transmission system, a plurality of optical signals, or channels, are transmitted through a single optical fibre. These channels each have different carrier wavelengths and are separated (de-multiplexed) at a receiving end to produce a plurality of independent received signals. In this way, a large amount of data may be transmitted through a single optical fibre.

During transmission along the fibre, signal quality of each channel will degrade due to fibre losses. Moreover, the signal quality will further degrade if additional components, such as amplifiers, are introduced to the line.

The fibre losses and amplifier gains along a link in an optical transmission network have a dependency on wavelength. Even if all wavelengths in a WDM system are launched with the same power the power levels at the receivers will be different for each wavelength. Furthermore the transmission quality will be different for each wavelength.

In order to address the above problem, the launch powers can have a varying degree of pre-emphasis applied to equalize channel optical signal to noise ratios (OSNRs) at the receivers, or more usefully, equalize the transmission quality of the wavelengths. The latter is more appropriate as received OSNR is not the only factor affecting the relative performance of each wavelength. The pre-emphasis takes the form of varying the drive signal applied to the source of each channel, thereby altering the relative transmit power of the channel.

Some time varying effects in the transmission system, such as polarization induced fluctuations, amplifier aging, system repair, temperature effects, which differentially affect the channels, can be mitigated by adjusting the pre-emphasis applied to each wavelength. However, this mitigation is only useful if the wavelength pre-emphasis is continuously adjusted throughout the life of a transmission system.

In a conventional system arranged to offer pre-emphasis, a central controller is provided to adjust the power output of each transmitter in the system used to transmit the constituent channels of the WDM signal. In this way, the relative optical powers of the constituent channels of the WDM signal can be optimised.

However, such conventional systems are often slow to react to changes in the system for a number of reasons. For example, the calculations required by the central controller in order to calculate the optimal pre-emphasis across the WDM signal are complex. Moreover, in order to optimise the power of each channel, the controller must separately transmit the calculated optimum to each transponder. This causes an inherent delay in the operation of the system. While the extent of this delay may be acceptable in relatively stable systems, the burden on components of the network linking the controller to the transponders during periods of significant change (when a large number of instructions must be sent) is found to result in an unacceptable delay which is prejudicial to the quality and effectiveness of the entire communications system.

SUMMARY OF THE INVENTION

According to a first aspect of the application, there is provided a transmitter for use in a wavelength division multiplexed system, comprising:
an optical source for transmitting an optical signal;
an interface for receiving a measured value of a quality metric of the optical signal and for receiving a desired value of the quality metric; and,
a controller for adjusting a drive power of the optical source such that the measured value substantially equals the desired value.

The transmitter of the first aspect of the present invention acts autonomously to adjust its pre-emphasis (or drive power) to achieve a desired performance value received from an external source. The desired value does not necessarily represent the optimum value for the particular signal transmitted by the transmitter, but will instead be chosen with the requirements of the overall WDM system in mind. In this way, a system of such transmitters is able to produce appropriate pre-emphasis across the entire system without requiring substantive central control.

The ability of the transmitter to react without direct external control allows it to respond far more quickly than was possible previously. This is particularly advantageous when real time perturbations occur on the transmission line, as it allows the transmitter to compensate for these without delay. In this way, the transmitter can react to transient effects that would otherwise have been impossible to address due to the slow reaction of prior art systems.

Transmitters according to the present invention also reduce the overall load on the electrical control network of the system in which they operate. There is no need for a central controller to constantly send control messages to each transmitter in the system, and as such network buses and other network components are not overloaded by such messages.

The controller is preferably arranged to apply a dither algorithm to the drive power, and to adjust the drive power in dependence on the results of the dither algorithm. In preferred embodiments, the amplitude of the dither algorithm is variable.

The preferred quality metric used by the present invention is bit error rate (BER), which is directly related to the Q value. However, other quality metrics, such as signal-to-noise ratio (SNR) or the amplitude of the signal, may also be used. The quality metric is typically measured at the receiver end of a transmission line over which the optical signal is transmitted. As such, the quality metric provides information regarding the quality of the received signal and the transmitter is able to adjust to compensate for effects that occur as the signal travels through the transmission line.

Typically, it is possible to obtain the same value of the quality metric at two distinct drive powers: one in a region of linear operation (in which increasing drive power increases the quality of the signal); and one in a non-linear region (in which increasing drive power reduces the quality of the signal). Preferably, the controller is arranged adjust the drive power such that the optical source functions in a region of linear operation. This reduces the overall power requirements of the system and is less likely to damage the optical source components.

In preferred embodiments, there is provided an optical system comprising:

a WDM transmitter comprising a plurality of transmitters according to the first aspect of the invention; and, a control processor for calculating the desired value of the quality metric for each optical signal, and for transmitting the desired value to each transmitter.

The desired value of the signal quality metric is preferably chosen as the average of the current value for all transmitters in a system. This causes each transmitter to produce the same output quality resulting in a uniform and predictable response across the system. However, alternative arrangements are envisaged. For example, the desired value for each channel may differ according to a priority rating given for that channel, such that the quality of some channels may be assured to a higher level than that of others.

Preferably, the transmitters are arranged into one or more bands, each band comprising one or more transmitters and comprising a band gain amplifier, and wherein the control processor is adapted to apply a centralization signal to the one or more transmitters in a given band in order to maintain an average drive power level for that band, and the band gain amplifiers are configured to compensate for the effect of the centralization signal. In this way, an overall increase in the optical power required from a band need not increase the average work load on the transmitters within the band (since the band gain amplifier compensates for this). As such, the lifetime and reliability of the transmitters can be maintained regardless of the actions of the transmitters in assuring that the measured optical signal quality metric matches that which is desired.

The band gain amplifiers are preferably configured to ensure a constant total optical output from the system. This ensures that the relative powers of the optical signals that result from the optical system and other parameters that may become pertinent during use are ensured. For example, transmission systems often include loading channels in addition to the data channels created by the optical system of the present invention and it is desired to maintain a constant ratio between the loading channels and the data channels.

In preferred embodiments, the transmitters are integrated into transponders that may also be used to receive signals.

According to a second aspect of the present invention, there is provided a method for controlling an optical transmitter, comprising:

receiving a measured value of a quality metric for an optical signal transmitted by an optical source in the transmitter driven at a first drive power;

receiving a desired value of the quality metric; and, adjusting the drive power so that the measured value of the signal quality metric substantially equals the desired value.

Preferably, the method further comprises dithering the drive power, wherein the step of adjusting the drive power is taken in dependence on the effect of said dithering on the measured value of the quality metric.

In preferred embodiments, the transmitter is one of a plurality of transmitters in an optical system, the plurality of transmitters transmitting a plurality of optical signals, and the method further comprises the step of calculating the desired value of the quality metric for each transmitter.

BRIEF DESCRIPTION OF THE DRAWINGS

A preferred embodiment of the present invention is described below with reference to the attached drawings, in which.

DETAILED DESCRIPTION

Figure 1:
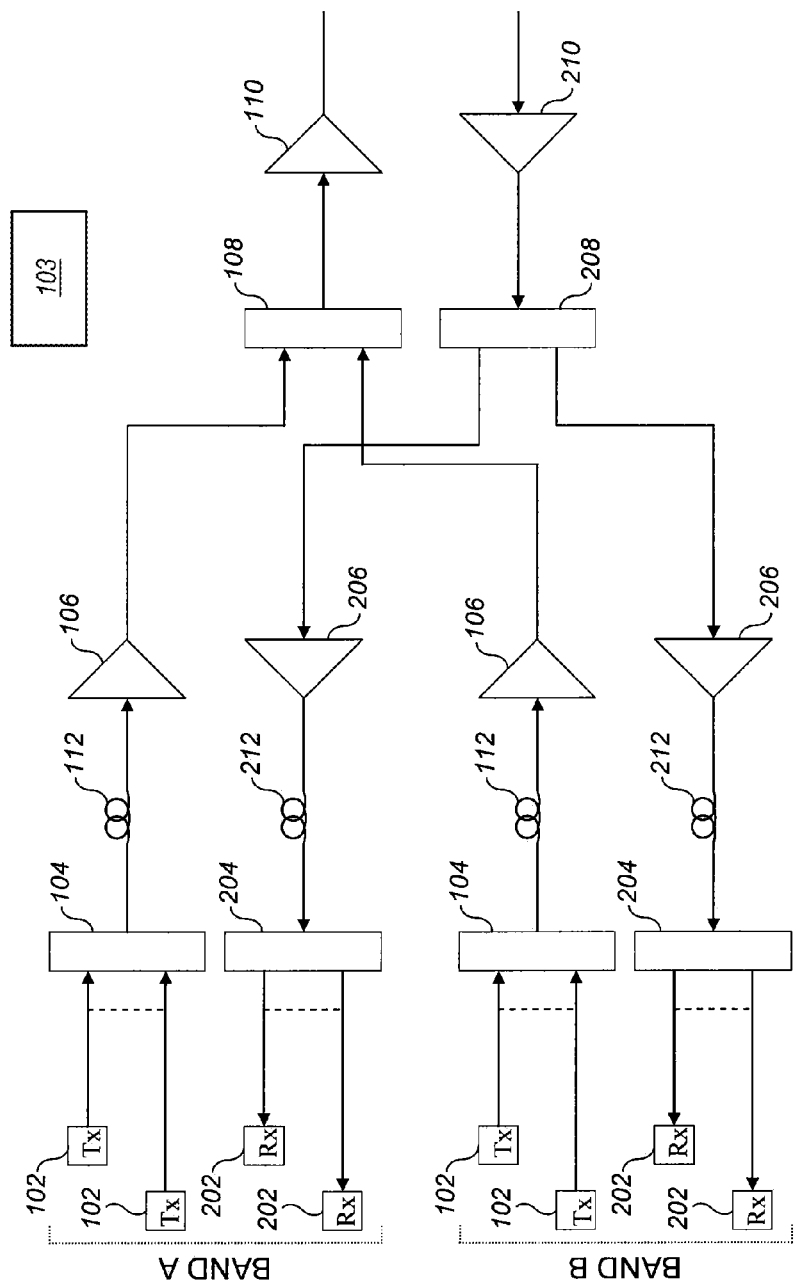
FIG. 1 shows a schematic representation of an optical system in which the present invention may be implemented; and, FIG. 2 shows the relationship between input drive power and bit error rate (BER) for a transponder that may used in accordance with the present invention.
Figure 2:
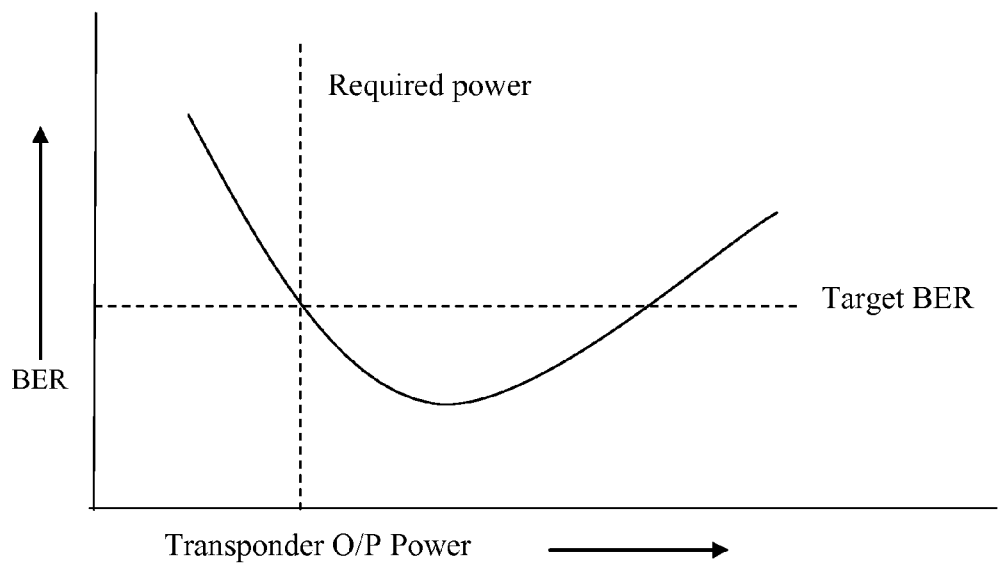

A transmission system in which the present invention may be implemented is shown in FIG. 1. This system is capable of both transmitting and receiving wavelength division multiplexed (WDM) optical signals. As shown, both transmitters and receivers are divided into a number of different bands, each band being used to process a subset of the channels within the WDM signal. This banded architecture has been found to minimise equipment requirements allowing effective compensation for dispersion effects during transmission of the optical signal.

The system illustrated in FIG. 1 is part of submarine line terminal equipment (SLTE) and is able to transmit long haul optical data communications.

As shown in FIG. 1, the channels within a band are multiplexed and de-multiplexed by channel multiplexors/de-multiplexors (CMDs 104). The bands themselves are multiplexed by band multiplexors/de-multiplexors (BMDs 108) in order to provide the link between the bands and the overall WDM signal. Band amplifiers 106 act on the multiplexed bands, while a further aggregate amplifier 110 (or "post amplifier") acts on the WDM signal itself.

Each channel within the band is produced by an optical source within an optical transponder 102, which in this mode acts as a transmitter. The optical sources are driven by electrical drive signals having a particular drive power, which in turn affects the optical power output of the optical sources. These optical sources feed directly into the band multiplexors.

The SLTE shown in FIG. 1 also acts to receive optical signals, and has analogous components for reception as those described above for transmission. In particular, the SLTE includes band amplifiers 206 and an aggregate amplifier 210, along with CMDs 204 and BMDs 208, in order to receive the channels within a WDM signal separately at a number of further optical transponders 202, which in this case act as receivers.

Transmission lines often suffer from dispersion effects. In order to mitigate these, the transmission side of the SLTE incorporates dispersion compensating fibre (DCF) 112 for each band. The DCF 112 for each band may be different, as dispersion effects are often a function of wavelength. In this way, the band structure of the SLTE shown in FIG. 1 allows for effective compensation of dispersion in the line.

Similarly, the receiver side of the SLTE shown in FIG. 1 also includes DCF 212. This functions analogously to the DCF 112 in the transmitter side. Moreover, further DCF (not shown) may be incorporated at other stages of the transmission/reception of the signal; for example, DCF may be placed after the BMDs 108 in order to compensate the entire signal, or prior to the CMDs 104 in order to compensate individual channels. Additional DCF may be incorporated in the receiver side of the SLTE in the same way.

Although not shown in FIG. 1, it is possible that one or more bands may be replaced by loading channels. Loading channels do not transmit data but provide light to balance the transmission system. Loading channels of this kind are not the subject of the present invention, which relates to the optimisation of parameters for data channels produced by transponders of the type described above.

The system shown in FIG. 1 is controlled by a device such as a rack control processor (RCP) 103. The RCP 103 is able to monitor and assess characteristics of the system, and to instruct actions by system components. Other components in the system, notably the transponders, may also have a degree of independent logic and some control over their settings. In particular, the transponders acting as transmitters are able to receive measurements of optical signal quality (such as bit error rate (BER)) from far-end receivers which receive the channel transmitted by the transponder. This information is typically contained in the transmission overhead of a return optical signal transmitted by the receiver.

The present invention is able to manage and optimise, in particular, the output power of the transmission transponders 102, and the gain applied by the BMDs 108.

The present embodiment provides an automatic pre-emphasis control algorithm that is distributed between the RCP and the individual transponders. The RCP runs that part of the algorithm that requires a purview of the whole of the system and the performance of all channels, while the individual transponders which are tasked with managing their own output powers based on far end BER feedback.

The action of the transponders ensures that working channels' share of the total power launched fairly between the channels in all bands. In this context, "fairly" means that each channel achieves a similar Q. However, it is envisaged that other signal quality metrics may be used (such as optical output power). It is noted that Q has a direct relationship to BER.

In operation, the RCP sets a target BER for the transponders and the transponders independently (and in parallel) adjust their output powers to achieve that target. The RCP periodically samples the current BER being achieved on all channels, calculates a rolling average BER for the system from those values, and sets that average as a target for each channel.

Transponder firmware includes a control loop to automatically adjust the transponder output power to achieve a given target BER. Each transponder operates independently so once the RCP control loop sets a target BER for each transponder, all transponders in parallel move their output powers to achieve that target.

A typical BER response to transponder output power adjustment is illustrated by 2. Up to a certain power level the BER decreases with increasing power but beyond a certain point the response becomes non-linear and an increase in power increases the error rate.

Given a particular target BER there may be two power levels at which that target is achieved. The BER targeting control loop will always move the transponder output power into the linear operating region.

The control loop operates by applying dither to the transponder output power and moving the power set point in response to the BER feedback. If the response is non-linear, i.e. if dithering the power up increases the BER or dithering down decreases BER, the power set point is always decreased. When in the linear region the power set point is increased or decreased appropriately to achieve the target BER. Wherever the starting point is on the response curve the control loop will move the output power to the required value. Furthermore as the loop is operating continuously the output power is continually adjusted to adapt for changes in the response curve.

The dither amplitude is automatically adapted, within limits, to provide statistically significant feedback. I.e. if, for a particular channel on a particular system, the dither amplitude is judged not to be providing significant feedback the dither amplitude used on that channel will be increased independently of other channels' circumstances. The dither amplitude will be reduced if there is more than sufficient BER/Q difference peak to peak.

Figure 3A:
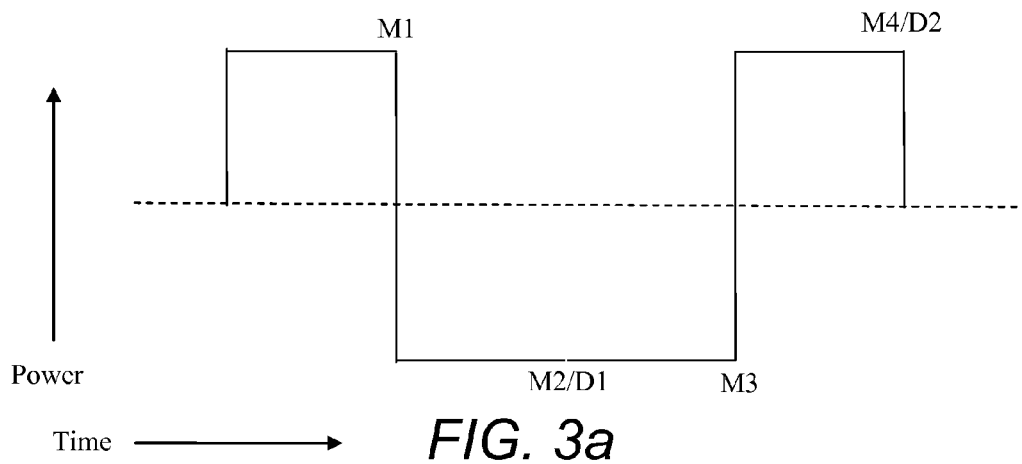
FIGS. 3a to 3c illustrate potential dithering processes for use in accordance with the present invention.

The preferred dither control loop is now described with reference to FIGS. 3a to 3c. FIG. 3a shows the loop when no adjustment is made to the drive signal, FIG. 3b shows the case where the drive signal is reduced, and FIG. 3c shows the case where the drive signal is increased.

Figure 3B:
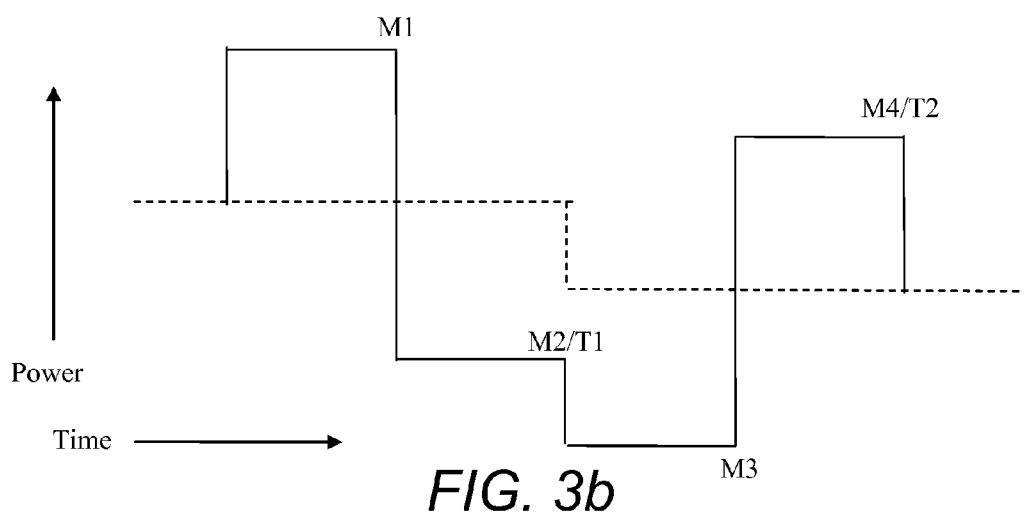
Figure 3C:
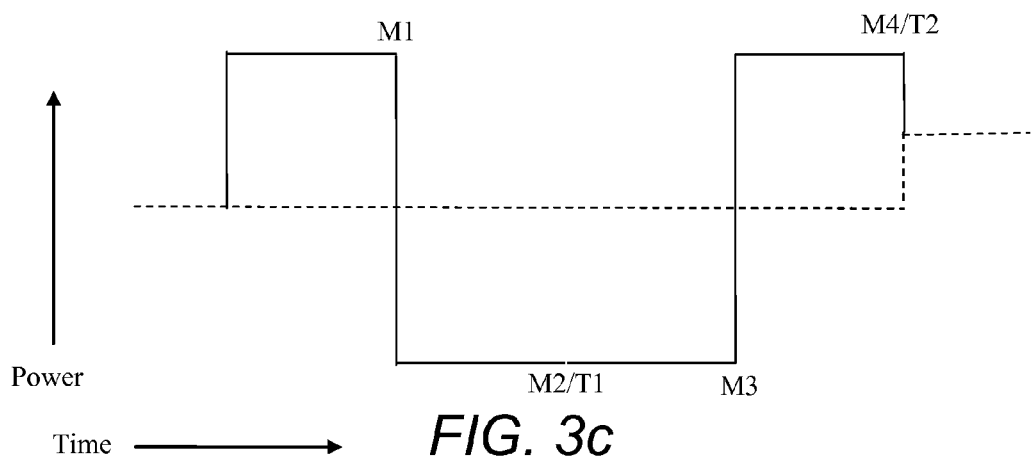

FIGS. 3a to 3c illustrate drive signal on the y axis and time on the x axis. The nominal power set point is shown by the dashed line and the dither imposed on the drive signal is illustrated by the solid line. Measurements of the BER are taken at points M1, M2, M3 and M4, while decisions on whether there should be adjustment of drive level are taken at points D1 and D2. The decision at D1 is as to whether a step down in the nominal output power should be made and the decision at D2 is whether a step up is required.

The step down decision (at D1) is as follows:
Step down if in non-linear region (i.e. M2<M1), otherwise
Step down only if the measurements made at both M1 and M2 are less than the target BER.
The latter condition allows the dither to straddle the target but not move through it. The step down decision is illustrated in FIG. 3b.

The step up decision (at D2) is as follows:
Step up if in linear region (i.e. M4<M3) and
The measurement made at M3 is greater than the target BER FIG. 3c illustrates the dither cycle when a decision to step up is taken.

The amplitude of the dither applied to the drive signal is significant. In particular, it must be sufficient to ensure a significant measured difference in error rate between the dither extremes. On the other hand it should not be so large that it imposes unnecessary transmission penalty. A fixed dither amplitude may be suitable for some systems operating at particular error rates but may be too big or small for others. The transponder adapts the dither amplitude used to an optimum value. In order to do so, the amplitude is chosen so to ensure that difference between the measurements have a set statistical significance.

Assuming BER measurements are contaminated by Gaussian noise, the accuracy X in percentage terms, of the measurements used by the loops is given by the relation:

$$X = \pm \pm 100 \, m/\sqrt{k} \quad [i]$$

within ±mσ limits (where σ is the standard deviation), were k is the number of bit errors counted to arrive at the error rate. In this preferred embodiment k is chosen to be at least 100, but other values of k may be used according to the required accuracy of the system.

Defining two BER measurements $e_1$ and $e_2$ as significantly different from each other if they differ by >2σ, the 95% confidence limit, then a relation between the error rates can be derived:

$$|(e_1 - e_2)/(e_1 + e_2)| < 1/\sqrt{k} \quad [ii]$$

At the points D1 and D2 in the dither cycle illustrated in FIG. 3 the dither amplitude is adjusted such that the proportion of measurement pairs that satisfy the inequality [ii] is maintained at a particular level. This level can be adjusted to suit a particular system; the default level is set at 90%.

The transponder power control loop can operate more quickly at high bit error rates than at low bit error rates since the time taken to accumulate a statistically consistent BER measurement at high error rates is shorter than at low bit error rates, e.g. at a BER of 1e-5 a measurement can be accumulated within 25 ms whereas at 1e-9 it can take of the order of 10 seconds (excluding line latency, i.e. round trip delay).

By constraining the ramp rate, i.e. the maximum rate at which a transponder can move its drive power, the difference in responsiveness between transponders operating at different error rates can be reduced. It also allows an appropriate balance between the transponder loops and the centralized centralization loops to be struck.

In order to impose a maximum rate at which the drive power can be altered, a minimum period between dither cycles (such as those shown in FIG. 3) is adopted.

The variation of the transponder drive powers as described by the dither cycles above may lead to the transponders being driven at drive levels which are inappropriate or compromise the reliability of the optical source. However, as described above in relation to FIG. 1 the channels leaving the transponders are subsequently amplified before passing through the transmission line. As such, a variation in the drive power (and so power output) of a transponder may be compensated by an inverse variation in the gain applied to that channel by the amplifier. This process is referred to hereinafter as channel power centralization.

In the preferred embodiment of the present invention, channel power centralization operates discretely on each band within a system. An algorithm is employed that adjusts the output powers of all the transponders within a band up or down (each by the same amount) to achieve a constant power into the band compensation amplifier. The gain of the band compensation amplifier for that band is adjusted so as to negate any affect on the channels' performance (for example, if the transponder powers are all stepped down by 0.1 dB the amplifier gain is increased by 0.1 dB). The effect of this of this algorithm is to transfer any overall band pre-emphasis demanded by the transponders into an amplifier gain adjustment. The average transponder output powers within a band are maintained centralized around an average set at loop start up.

The adjustment $P_{adj}$ to be applied to the transponders within a band to centralize them around the target average channel power $P_{target}$ on loop start up is the difference between the current average and the target, i.e.:

$$P_{adj} = P_{target} - 10\log_{10}\left(\left(\sum_{i=1,n} 10^{(P_i/10)}\right)/n\right)$$

Where $P_i$ is the output power of the ith transponder in the band and n is the number of transponders in the band. The compensating adjustment to the gain of the associated band amplifier $G_{adj}$ in order to null out the change in transponder powers is simply:

$$G_{adj} = -P_{adj}$$

Although the correction of the pre-emphasis of the transponders leads to a "fair" sharing of input power, it does not take account of the fact that it is desirable to maintain the total output power of the system leading into the post amplifier constant at all times. For example, in the case where loading channels are also fed into the post amplifier it is required to maintain the ratio of power between these channels and the data channels produced by the transponders.

In order to ensure consistency of total output power, a The band gain centralization algorithm samples the gain of each band compensation amplifier feeding the band multiplexer and adjusts the gains of the amplifiers up or down (each by the same amount) to achieve constant total output from band amplifiers. Adjusting each amplifier by the same amount (in dB terms) maintains the relativities between bands.

It is necessary that the total power delivered into the post amplifier from the operating channels is maintained constant so that for a system that has loading channels the ratio of operating channel power to loading channel power is maintained constant.

Furthermore, tying down the total output from the band amplifiers has a further beneficial effect. It prevents the gains of the band amplifiers drifting up or down due to subtle and unpredictable biases or mathematical rounding errors.

The adjustment to be applied to the band amplifier gains to ensure that the combined power output of the band compensation amplifiers is constant is the ratio of the required power output to the current power output expressed in dB terms.

The initial or target power, i.e. the power delivered by the band amplifiers before the transponder loops apply any channel pre-emphasis or any channel power centralization is performed, is:

$$10\log_{10}\left(\sum_{b=1,m} 10^{((I_b+G_b)/10)}\right)$$

Where $I_b$ is the input power to the bth band compensation amplifier, $G_b$ is the gain of that amplifier and m is the number of bands.

The current power being delivered by the band amplifiers, i.e. the power after the transponder loops have applied pre-emphasis and channel power centralization has been performed, is:

$$10\log_{10}\left(\sum_{b=1,m} 10^{((I_b+G_{adj_b}+G_b)/10)}\right)$$

Where $G_{adj_b}$ is the gain adjustment to balance the channel centralization for the bth band.

The adjustment to the band amplifier gains to maintain constant output is therefore:

$$G_{adj} = 10\log_{10}\left(\sum_{b=1,m} 10^{((I_b+G_b)/10)}\right) - 10\log_{10}\left(\sum_{b=1,m} 10^{((I_b+G_{adj_b}+G_b)/10)}\right)$$

This can be simplified slightly to:

$$G_{adj} = 10\log_{10}\left(\left(\sum_{b=1,m} 10^{(I_b+G_b)/10}\right)/\left(\sum_{b=1,m} 10^{(I_b+G_{adj_b}+G_b)/10}\right)\right)$$

Further, it should be noted that the term $\sum_{b=1,m} 10^{(I_b+G_b)/10}$ is the value that is being kept constant and therefore only need to be calculated once when the algorithm is started and not every loop iteration.

Although described above separately, the channel power centralization and band gain control procedures may be combined together in a single calculation in order to eliminate multiple sequential changes to amplifier gain settings. An example of such a combined algorithm is expressed in pseudo code below:

```
/* Initialisation block to be executed once when the control loop is started */
for each band b
{
    /* first centralise the transponder powers around the target average power
*/
    for each transponder t in the band
    {
        transponderPower_dBm[t]=getTransponderOutputPower_dBm(t);
        totalBandPower_mw=totalBandPower_mw+10^(transponderPower
            _dBm [t]/10);
    }
        averageBandPower_mw=totalBandPower_mw                    /
numTranspondersInBand;
        channelPowerAdjustment_dB=targetChannelPower-
10*log10(averageBandPower_mw)
    for each transponder t in the band
    {
        setTransponderOutputPower( transponderPower_dBm [t]  +
        channelPowerAdjustment_dB);
    }
    /* Now record the band compensation amplifier input power and gain */
    targetBandAmplifierInputPower_dBm[b]=getBandAmplifierInputPower_dB
m(b);
    bandGain_dB[b] = getBandAmplifierGain_dB(b);
}
targetTotalBandAmplfierOutput_mw = Sum over all bands of: 10^(
(targetBandAmplifierInputPower_dB[b] + bandGain_dB [b] ) / 10) )
/* Algorithm executed every loop iteration */
for each band b
{
    channelPowerAdjustment_dB= targetBandAmplifierInputPower_dBm[b] -
getBandAmplifierInputPower_dBm( );
    for each transponder t in the band
    {
        setTransponderOutputPower(getTransponderOutputPower_dBm(t) +
channelPowerAdjustment_dB);
    }
    /* remember gain change required to balance channel centralisation */
    deltaBandGain_dB[b] = - channelPowerAdjustment_dB;
    /* read and remember current band amplifier gain settings */
    bandGain_dB[b] = getBandAmplifierGain_dB( );
}
/* Calculate the band gain adjustment that is required to maintain constant power into the post
amplifier once the channel power centralisation delta is applied.
Note    that    targetTotalBandAmplfierOutput    _mw   and
targetBandAmplifierInputPower_dBm[b] are calculated/read on loop start up
*/
bandGainAdj_dB  =  10*log10(targetTotalBandAmplfierOutput_mw/
(Sum over all bands of: 10^( ( targetBandAmplifierInputPower_dBm[b] +
deltaBandGain_dB [b] + bandGain_dB [b] ) / 10 ) );
for each band b
{
    setBandAmplifierGain_dB( bandGain_dB [b] + deltaBandGain_dB[b] +
bandGainAdj_dB );
}
```

As mentioned previously, the RCP controls the overall performance of the system. In particular, the RCP causes the various control algorithms to run. The fundamental algorithm is the Q equalization algorithm (i.e. the feedback loop based on BER to control the drive signal of the transponders) since this is what imparts pre-emphasis on to the system and it is this to which the gain control and channel power centralization loops respond.

An example of the looped sequence in which the RCP may order the various algorithms to take place is as follows:
1. Run Channel Power Centralization and Band Amplifier Gain Control algorithms.
2. Wait 15 seconds.
3. Run Q Equalization algorithm
4. Wait variable number of seconds.
5. Repeat from 1.

The delay at 2 in the loop gives sufficient time for the power and gain changes to be effected and for any error rate changes to feed through before they are sampled at 3. 15 seconds is sufficient to accumulate a BER measurement at 1e-9.

The variable delay at 4 is to allow the channels sufficient time for the transponders to move their output powers in response to the target set for them by the Q equalization algorithm. The length of this delay is chosen depending on the best BER of all transponders sampled; the smaller the best BER the longer the delay.

The system may include configurable limits to the behaviour of the algorithms in order to prevent hardware failures or unexpected system behaviour causing working channels to be unduly impaired by the faulty channels. These limits are referred to as clamp limits and when reached cause the relevant algorithm to stop.

A channel power clamp prevents the pre-emphasis applied to channels within a band exceeding a specified amount. That is, the difference in power between in highest power channel in a band and the lowest is not allowed to exceed the clamp setting. The same setting is used for all bands.

A band amplifier gain clamp prevents the pre-emphasis applied to bands exceeding a specified amount. That is, the difference between the highest band amplifier gain and the lowest is not allowed to exceed the clamp setting.

There are a number of parameters that can be tuned to alter the behaviour of the system. A possible set of default settings that has been found to be effective in practical systems is detailed below.

Adaptive Dither Amplitude Enabled (Default: TRUE)

The adaptive dither amplitude feature may be enabled or disabled. If disabled the dither amplitude is fixed.

Dither Amplitude (Default: 0.2 dB Peak to Peak)

The starting value for the dither amplitude if the adaptive feature is enabled or, if disabled, this is the fixed dither amplitude to be used.

Maximum Dither Amplitude (Default: 1 dB Peak to Peak)

The maximum peak to peak value that the dither amplitude is allowed to increase to if the adaptive dither amplitude feature is enabled.

Minimum Dither Amplitude (Default: 0.1 dB Peak to Peak)

The minimum peak to peak value that the dither amplitude is allowed to shrink to if the adaptive dither amplitude feature is enabled.

Dither Amplitude Step Size (Default: 0.01 dB)

The delta by which the dither amplitude is increased or decreased when a decision is taken that the amplitude needs to grow or shrink to achieve the target feedback level.

Target Significance Factor (Default: 0.9)

The proportion of measurement pairs that should satisfy the inequality [ii] above.

Output Power Step Factor (Default: 0.25)

The proportion of the dither amplitude that the nominal transponder output power increased or decreased by if a step up or step down decision is made.

Maximum Power Ramp Rate (Default: 0.1 dB/s)

The maximum rate at which the transponder is allowed to adjust its nominal output power.

The system of the preferred embodiment is designed to withstand a number of failures, and take appropriate action on encountering them. The following details some possible failures and the steps taken to avoid unwanted consequences.

Initialization Failures

The pre-emphasis algorithm will not start if:
1. The RCP fails to set all of the band amplifiers into constant gain mode.

Runtime Failures

Channel Power Centralization

The channel power centralization algorithm fails and will cause the pre-emphasis algorithm to stop if:
1. The RCP fails to set the output power of at least one of the transponders in a band.
2. The RCP fails to retrieve the output power of at least one of the transponders in a band.
3. If the calculated output power of any transponder is outside its dynamic range, i.e. −1 dBm to −12 dBm.

Band Amplifier Gain Control

The band amplifier gain control algorithm fails and will cause the pre-emphasis algorithm to stop if:
1. The RCP fails to retrieve the current gain settings of all the band compensation amplifiers.
2. The RCP fails to set the new gain of any of the band compensation amplifiers.
3. The calculated new gain setting will (or does) push the amplifier beyond it operating envelope. Note that the gain control loop does this both by calculation and by trial. The gain setting is considered out of limits if not between +10 dB and +26 dB. Once the new gain is set the actual gain achieved by the amplifier is checked and if not within expected limits of the setting the loop is failed. This procedure is adopted since the amplifier may not be able to achieve the requested gain, even if nominally in the appropriate range, if its input signal is low.

Clamp Limits

The pre-emphasis algorithm will stop as described above if any of the clamp limits is reached.

Failure Scenarios

Faulty Transponder Transmitter/Receiver

If a transponder develops a fault with its transmitter (or the receiver in the associated far end transponder develops a fault) such that the BER is degraded for a channel then the transponder will attempt to recover the channel's performance by increasing its output power. This behaviour is potentially detrimental to the other channels in the system, in that other (fault free) channels' performance is being degraded to compensate for a failed or failing circuit pack.

This situation is prevented from going to an extreme by the Channel Power Clamp. Once the pre-emphasis within a band hits the clamp the pre-emphasis control algorithm stops operating.

Tenuous Power/BER Coupling

It is possible that some line conditions may result in one or more channels in a system that have a very tenuous coupling between launch power and BER. That is, the performance of a channel is unaffected by significant launch power changes. This situation will result in the transponder power control loop being unable to achieve the target BER set by the RCP. The dither algorithm will not get significant BER feedback.

The RCP detects that a channel is exhibiting this behaviour by observing that a transponder's dither amplitude has reached its maximum limit. In this situation the BER of the affected channel is not included in the calculation of the target BER. However, its output power is adjusted as part of the channel power centralization algorithm and the RCP continues to set BER targets for it to try and achieve.

The reason for excluding its BER from the average is to prevent pollution of the target by the misbehaving channel. If, for example, its BER was worse that the target and it was included when calculating the average then the effect over time would be that all channels would converge to that same poor performance.

If the channel starts to be responsive to power changes (i.e. the dither amplitude is reduced from the maximum) its performance is re-included into the Q equalization calculation.

Transponder Removal at Transmit SLTE

The pre-emphasis control algorithm continues unaffected by removal of a transponder at the transmitting SLTE. As the transponders output power cannot be read or set by the RCP it is not included in the power centralization calculation, i.e. the RCP automatically behaves as though there were one less channel in the band affected. The system effect is that immediately after removal the remaining channels in the band will exhibit a step change improvement in their performance but as the loop re-converges the overall effect will be that the performance across all of the remaining channels in the system will be equalized as the newly available photons are shared equitably between all channels in all bands.

Re-insertion of the transponder will exhibit exactly the reverse behaviour in that the other channels in the band will exhibit a step change down in performance until the loops again re-converge on an equitable distribution of the available light across all channels.

Transponder Removal/Failure at Receive SLTE

Removal of a transponder or failure (e.g. a LOF situation) at the receive SLTE has the effect that the transmitting transponder cannot determine the received BER. The power control loop on the transponder stops automatically when it gets no measurements from the far end and the unavailability of a far-end BER is also recognised by the RCP which treats the channel in the same way as for the tenuous power/BER coupling described above. The affected channel is not included in the calculation of the target BER. However, its output power is adjusted as part of the channel power centralization algorithm and the RCP continues to set BER targets for it to try and achieve. It is likely that power will be "stolen" from the faulty channel and redistributed amongst the working channels. However, this situation is prevented from going to an extreme by the Channel Power Clamp (See above). Once the pre-emphasis within a band hits the clamp the pre-emphasis control algorithm stops operating.

Faulty Band Amplifier at Transmit SLTE

A faulty band amplifier at the transmitting SLTE is likely to be detected by the RCP determining that the gain demanded is not being supplied and the situation will be as though the amplifier is operating outside its envelope. If this situation is detected the pre-emphasis control algorithm stops operating.

Faulty Band Amplifier at Receive SLTE

A faulty band amplifier at the receiving SLTE is likely to cause degradation in the performance of all the channels in that band. The RCP at the transmitting SLTE will endeavour to compensate for the loss of performance by increasing the pre-emphasis of that band. This will be to the detriment of the channels in other bands.

This situation is prevented from going to an extreme by the Band Amplifier Gain Clamp. Once the pre-emphasis between bands hits the clamp the pre-emphasis control algorithm stops operating.

Band Amplifier Removal

Removal of a band amplifier at the transmit SLTE will result in the pre-emphasis control algorithm stopping.

Removal of a band amplifier at the receive SLTE will result in a whole band of transponders at the transmitter stopping BER targeting. There will be no effect on channels in other bands and control of the stopped channels will automatically restart when the band amplifier is replaced.

Common Path Failure

A failure in the common path at either the transmitting or receiving SLTE will result in the RCP not being able to receive a far end BER for any channel. In this situation the Q equalization algorithm does not update the target BER. Furthermore, all the transponder power control loops will stall due to the lack of far end feedback.

Once the failure is repaired the pre-emphasis control will automatically continue.

What is claimed is:

1. An optical system comprising:
   a wavelength division multiplexed (WDM) transmitter comprising a plurality of transmitters for transmitting a plurality of optical signals; and
   a control processor for calculating a desired value of a quality metric for each optical signal of the plurality of optical signals, and for transmitting the desired value to each transmitter; wherein each transmitter comprises:
      an optical source for transmitting a corresponding optical signal of the plurality of optical signals;
      an interface for receiving a measured value of a quality metric of the corresponding optical signal and for receiving the calculated desired value of the quality metric from the control processor so that a drive power of the optical source is adjusted within a region of linear operation such that the measured value equals the desired value,
   wherein the transmitters are arranged into one or more bands, each band comprising one or more transmitters and comprising a band gain amplifier, and wherein the control processor is adapted to apply a centralization signal to the one or more transmitters in a given band in order to maintain an average drive power for that band, and the band gain amplifiers are configured to compensate for the effect of the centralization signal.

2. The optical system according to claim 1, wherein the desired value is calculated by the control processor as the average value of the measured quality metric for the plurality of optical signals.

3. The optical system according to claim 1, wherein the control processor is arranged to calculate the desired value of the quality metric periodically and transmit the desired value to each transmitter periodically.

4. The optical system according to claim 1, wherein the control processor is arranged to calculate the desired value of the quality metric continuously.

5. The optical system according to claim 1, wherein the band gain amplifiers are configured to maintain a constant total optical output from the optical system.

6. Submarine line terminal equipment comprising an optical system, wherein the optical system further comprises:
   a wavelength division multiplexed (WDM) transmitter comprising a plurality of transmitters for transmitting a plurality of optical signals; and
   a control processor for calculating a desired value of a quality metric for each optical signal of the plurality of optical signals, and for transmitting the desired value to each transmitter; wherein each transmitter comprises:
      an optical source for transmitting a corresponding optical signal of the plurality of optical signals;
      an interface for receiving a measured value of a quality metric of the corresponding optical signal and for receiving the calculated desired value of the quality metric from the control processor so that a drive power of the optical source is adjusted within a region of linear operation such that the measured value equals the desired value,
   wherein the transmitters are arranged into one or more bands, each band comprising one or more transmitters and comprising a band gain amplifier, and wherein the control processor is adapted to apply a centralization signal to the one or more transmitters in a given band in order to maintain an average drive power for that band, and the band gain amplifiers are configured to compensate for the effect of the centralization signal.

7. A method for controlling an optical system comprising a wavelength division multiplexed (WDM) transmitter comprising a plurality of transmitters for transmitting a plurality of optical signals, the method comprising:
   an act of transmitting a plurality of optical signals each using a corresponding transmitter of the plurality of transmitters;
   an act of using a control processor to calculate a desired value of a quality metric for each optical signal of the plurality of optical signals;
   an act of transmitting the calculated desired value to a controller in each of the plurality of transmitters; and
   for each of the transmitters of the plurality of transmitters, performing the following:
      receiving a measured value of a quality metric for the corresponding optical signal transmitted by an optical source in the transmitter driven at a first drive power;
      receiving the calculated desired value of the quality metric from the control processor;

the controller adjusting the drive power such that the optical source functions in a region of linear operation and so that the measured value of the signal quality metric substantially equals the desired value; and the controller dithering the drive power, wherein the step of adjusting the drive power is taken in dependence on the effect of said dithering on the measured value of the quality metric.

8. The method according to claim 7, wherein an amplitude of the dithering is variable.

9. The method according to claim 7, wherein the quality metric is bit error rate of the optical signal.

10. The method according to claim 7, wherein the desired value is calculated as the average value of the measured quality metric for the plurality of optical signals.

11. The method according to claim 7, wherein the control processor calculates the desired signal quality metric periodically and transmits the desired signal quality metric calculated for each of the transmitters to the controller in each transmitter periodically.

12. The method according to claim 7, wherein the control processor calculates the desired signal quality metric occurs continuously.

13. A method for controlling an optical system comprising a wavelength division multiplexed (WDM) transmitter comprising a plurality of transmitters for transmitting a plurality of optical signals, the method comprising:
  an act of transmitting a plurality of optical signals each using a corresponding transmitter of the plurality of transmitters;
  an act of using a control processor to calculate a desired value of a quality metric for each optical signal of the plurality of optical signals;
  an act of transmitting the calculated desired value to a controller in each of the plurality of transmitters; and
  for each of the transmitters of the plurality of transmitters, performing the following:
    receiving a measured value of a quality metric for the corresponding optical signal transmitted by an optical source in the transmitter driven at a first drive power;
    receiving the calculated desired value of the quality metric from the control processor;
    the controller adjusting the drive power such that the optical source functions in a region of linear operation and so that the measured value of the signal quality metric substantially equals the desired value,
  wherein the transmitters are arranged into one or more bands, each band comprising one or more transmitters and comprising a band gain amplifier, the method further comprising:
  applying a centralization signal to the one or more transmitters in a given band in order to maintain an average drive power level for that band; and,
  compensating, at the band gain amplifier, for the effect of the centralization signal.

14. The method according to claim 13 further comprises stopping transmission of the optical signal when at least one of the band gain amplifiers is not set into constant gain mode.

15. The method according to claim 13 further comprising stopping amplification of the centralization signal when the desired value of the quality metric of at least one of the transmitters is not set, the measured value of the quality metric of at least one of the transmitters is not received, or the desired value of the quality metric of at least one of the transmitters is outside a predetermined range.

16. The method according to claim 13 further comprising controlling the band gain amplifiers, wherein the controlling of the band gain amplifiers comprises:
  retrieving a current gain value of each of the band gain amplifiers, and
  determining a new gain value of each of the band gain amplifiers.

17. The method according to claim 16 further comprising:
  stopping the band gain amplifiers if the current gain value cannot be retrieved,
  stopping the band gain amplifiers if the new gain value cannot be set, and
  stopping the band gain amplifiers if the new gain value pushes the band gain amplifier beyond its operating envelope.

* * * * *